United States Patent [19]
Lin et al.

[11] Patent Number: 5,855,224
[45] Date of Patent: Jan. 5, 1999

[54] FLAPPER CHECK VALVE

[75] Inventors: Ping Lin, Bedford; Rand Ackroyd, Methuen, both of Mass.

[73] Assignee: Watts Investment Company, Wilmington, Del.

[21] Appl. No.: 680,216

[22] Filed: Jul. 11, 1996

[51] Int. Cl.⁶ .................................................. F16K 15/00
[52] U.S. Cl. ...................... 137/527; 137/527.4; 137/512; 251/337
[58] Field of Search ................................ 251/86, 84, 337; 137/531, 530, 527, 527.4, 512

[56] References Cited

U.S. PATENT DOCUMENTS

| | | | |
|---|---|---|---|
| 387,831 | 8/1888 | Thomson | 73/258 |
| 1,245,740 | 11/1917 | Krieg | 73/197 |
| 2,503,424 | 4/1950 | Snyder | 137/144 |
| 2,706,488 | 4/1955 | Harrington | 137/116 |
| 3,478,778 | 11/1969 | Curtiss et al. | 137/527 |
| 3,687,157 | 8/1972 | Whitmer | 137/527 |
| 3,720,229 | 3/1973 | Masson et al. | 137/527.8 |
| 3,789,874 | 2/1974 | Hills | 137/527 |
| 4,022,421 | 5/1977 | Carlin | 137/527 |
| 4,054,153 | 10/1977 | Guyton | 137/527 |
| 4,232,704 | 11/1980 | Becker et al. | 137/218 |
| 4,284,097 | 8/1981 | Becker et al. | 137/218 |
| 4,304,255 | 12/1981 | Prince | 251/86 |
| 4,552,174 | 11/1985 | Carl et al. | 251/337 |
| 5,046,525 | 9/1991 | Powell | 137/512 |
| 5,085,076 | 2/1992 | Engelmann | 73/197 |
| 5,205,311 | 4/1993 | Wilkins | 137/531 |
| 5,584,315 | 12/1996 | Powell | 137/527 |

*Primary Examiner*—Denise L. Ferensic
*Assistant Examiner*—Joanne Y. Kim
*Attorney, Agent, or Firm*—Fish & Richardson P.C.

[57] ABSTRACT

A check valve assembly mounted for engagement with a valve seat includes a flapper valve and a lever arm. The flapper valve includes a bracket pivotably mounted along a first hemisphere of the valve seat, a valve plate mounted to the bracket along a region generally spaced from a periphery of the valve plate, and a mounting assembly adjustably joining the valve plate to the bracket. The flapper valve has a closed position with the valve plate in sealing engagement with the valve seat about the periphery of the valve plate. The lever arm is pivotably mounted to the valve seat along a second hemisphere of the valve seat opposite the first hemisphere. The lever arm includes a lever surface disposed for moving contact with an engagement surface of the bracket and a biasing means for biasing the lever surface toward contact with the engagement surface.

15 Claims, 7 Drawing Sheets

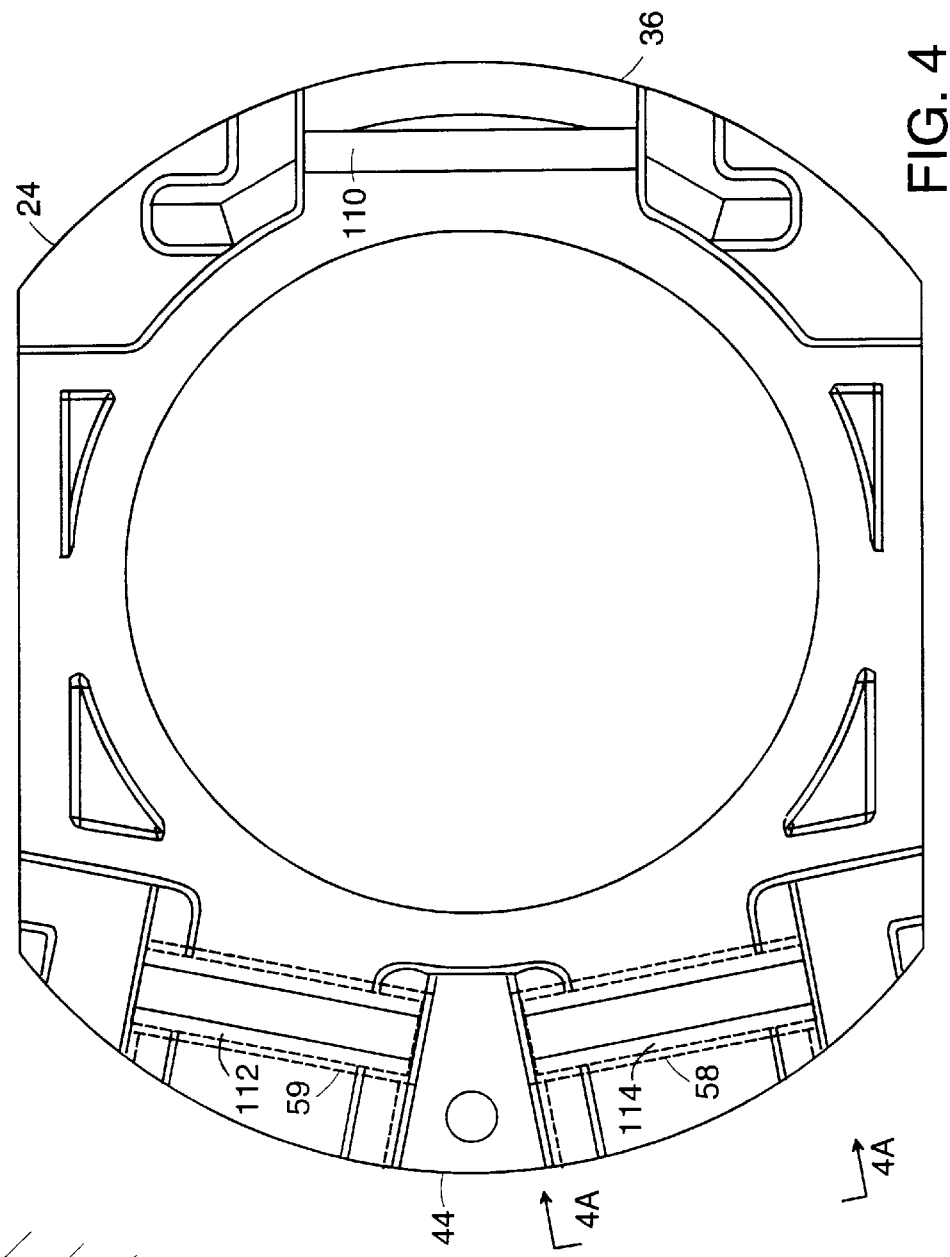
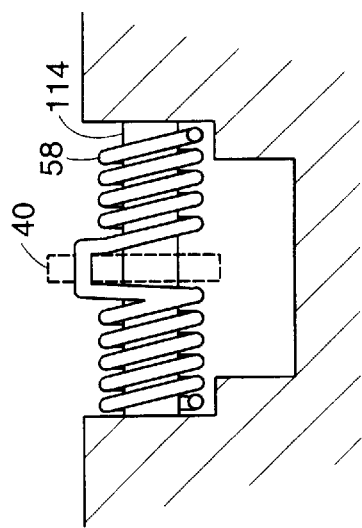
FIG. 4
FIG. 4A

FLAPPER CHECK VALVE

BACKGROUND OF THE INVENTION

This invention relates to check valves for backflow preventers.

Backflow preventers, examples of which can be found in U.S. Pat. Nos. 4,878,515, 4,044,787 and 3,918,477, are principally used for preventing contamination of a public water distribution system by preventing backflow or back-siphonage of contaminated water into the system. Usually, the backflow preventer assembly is installed in a pipeline between a main supply line and a service line that feeds an installation, e.g. hotels, factories or other institutions, or even a multi or single family residence. A backflow prevention assembly typically includes two check valves permitting flow only in the direction from the main supply line to the service line.

SUMMARY OF THE INVENTION

According to the invention, a check valve assembly mounted for engagement with a valve seat includes a flapper valve and at least one lever arm. The flapper valve includes a bracket pivotably mounted in a region along a first hemisphere of the valve seat, a valve plate mounted to the bracket along a region generally spaced from a periphery of the valve plate, and a mounting assembly adjustably joining the valve plate to the bracket. The flapper valve has a first, closed position with the valve plate in sealing engagement with the valve seat about the periphery of the valve plate and a second, open position spaced from the valve seat. The lever arm is pivotably mounted to the valve seat in a region along a second hemisphere of the valve seat opposite the first hemisphere. The lever arm includes a lever surface disposed for moving contact with an engagement surface of the bracket and a biasing means for biasing the lever surface toward contact with the engagement surface.

Preferred embodiments of the invention may include one or more of the following additional features. The valve plate defines a facing surface spaced from the bracket in a region spaced from a central region of the valve plate with the flapper valve in the closed position; the spacing permits adjustment of the valve plate relative to the bracket, e.g, by tilting relative to the bracket. The valve plate is mounted to the bracket at a central region of the valve plate. The lever surface comprises a cam surface. The bracket includes a roll pin defining the engagement surface. The biasing means comprises a spring. The valve plate includes a plate seal for engagement with the valve seat.

A second lever arm is pivotably mounted in the region along the second hemisphere of the valve seat; the bracket defines a second engagement surface and the second lever arm defines a second lever surface in moving contact with the second engagement. The second lever arm including a second biasing means for biasing the second lever surface toward contact with the second engagement surface. The region along the first hemisphere defines a flapper mount location and the region along the second hemisphere defines a first lever arm mount location and a second lever arm mount location, the first lever arm mount location and the second lever arm mount location are equally spaced about a point on the second hemisphere opposite the flapper mount location. The spacing between the lever arm mount locations is at an included angle in the range of about 20 to 90 degrees, preferably about 22 degrees.

The check valve assembly includes a body defining the valve seat; the body is adapted for retrofit into an existing valve opening. The body includes a seat seal for engagement with the existing valve opening.

According to another aspect of the invention, a backflow preventer comprises a body defining a conduit for flow of fluid between an inlet and an outlet, first and second check valves according to the invention disposed in sequence in the conduit. The valves have first positions permitting flow in a first direction and second positions opposing flow in a second direction opposite the first direction. The biasing means bias the valves toward the second position.

BRIEF DESCRIPTION OF THE DRAWINGS

FIG. 4 is a top view of a valve seat of the invention;

FIG. 4A is a side view of the valve seat of FIG. 4, taken along lines 4A—4A of FIG. 4, and showing a lever arm of the invention;

DESCRIPTION OF THE PREFERRED EMBODIMENTS

Figure 1:
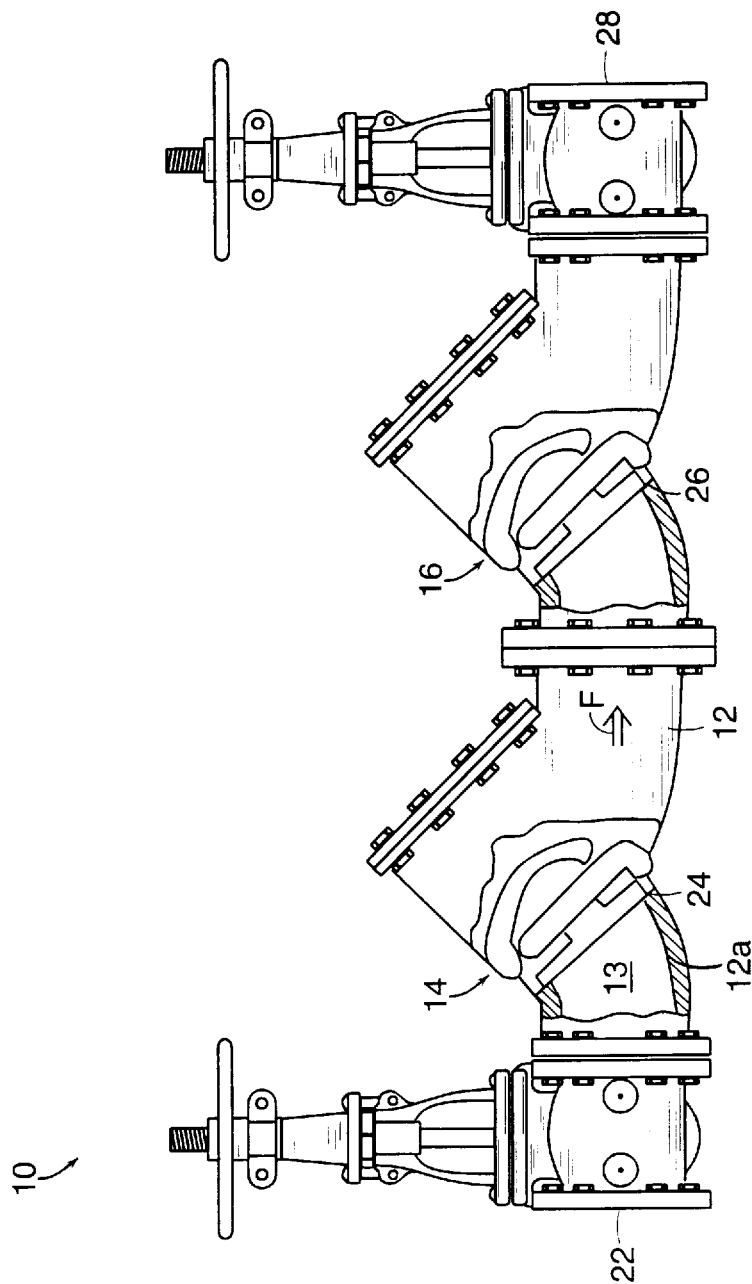
FIG. 1 is a front view, partially cut-away, of a backflow prevention assembly equipped with check valves of the invention.

Referring to FIG. 1, a typical backflow prevention assembly 10 consists of a body 12 having an inner wall 12a defining a conduit 13 for flow of water therethrough. A pair of check valves 14, 16 are mounted in sequence within the body in positions to allow flow of water through the conduit in a first direction, indicated by arrow, F, but to prevent backflow of water in the opposite direction. Check valves 14, 16 are biased to a closed position to require fluid pressure in the direction, F, to exceed a predetermined threshold before the check valves are opened.

Potable water from the public water distribution system enters the backflow prevention assembly 10 at the inlet end 22. Assuming that the supply pressure exceeds the predetermined threshold value biasing the check valves 14, 16 toward closed positions, the check valves are displaced from sealing engagement with the respective seats 24, 26 to allow water flow through conduit 13 of the valve body 12, to the outlet end 28. Test cocks, not shown, may be mounted to body 12 to allow monitoring of fluid pressure and flow in conduit 13.

Figure 2:
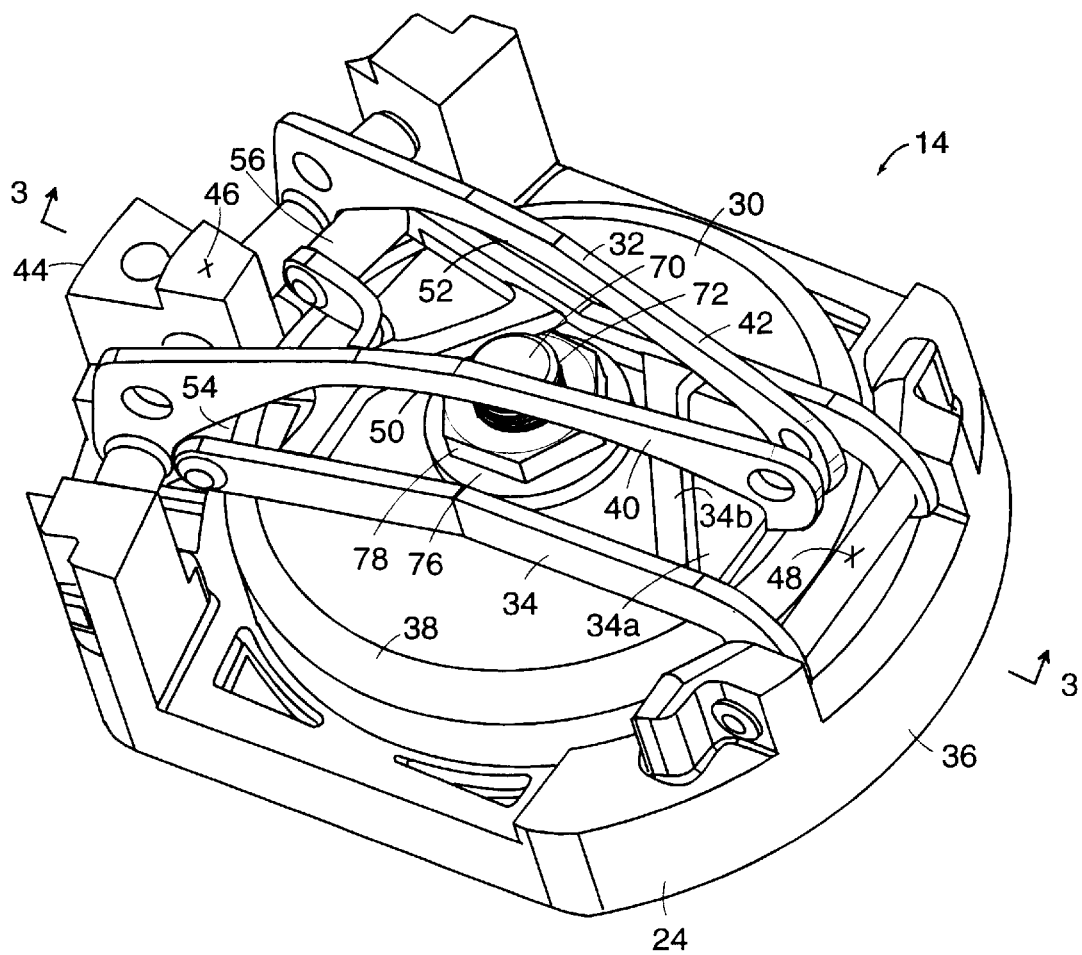
FIG. 2 is a diagrammatic top perspective of a check valve of the invention.
Figure 3A:
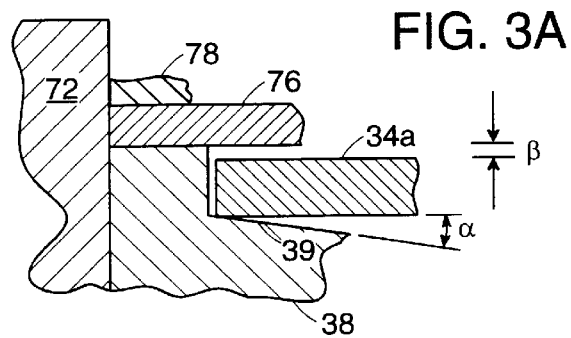
FIG. 3A is a cross-sectional side view of region 3A of FIG. 3.
Figure 3:
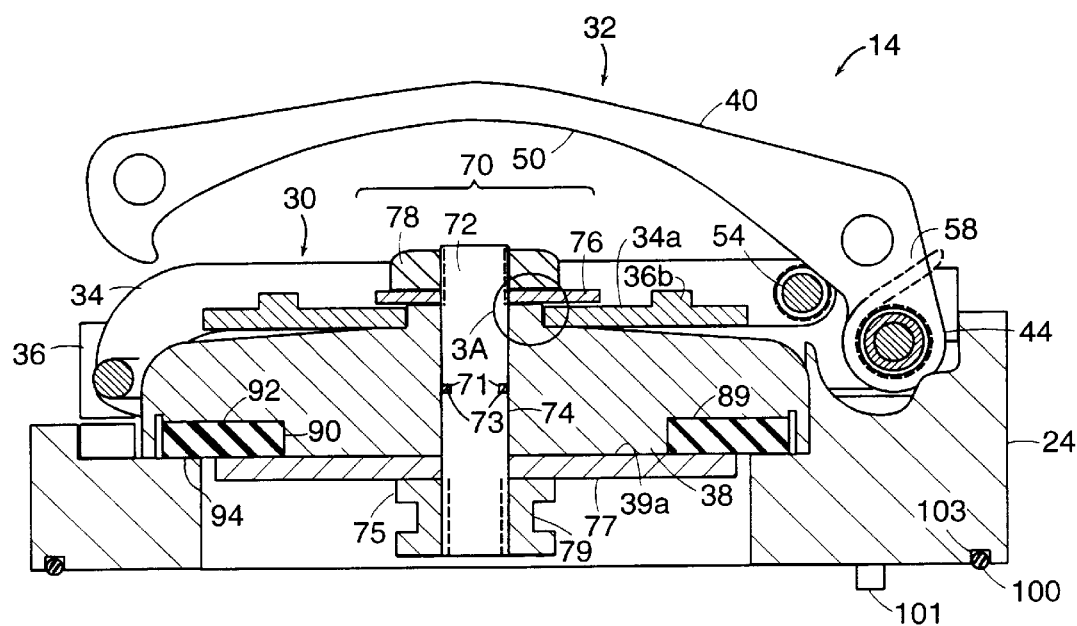
FIG. 3 is a cross-sectional side view of the check valve of FIG. 2, taken along lines 3—3 of FIG. 2, shown in its closed position.

Referring to FIGS. 2 and 3, check valve 14 of the invention (check valve 16 being identical) includes a flapper valve 30 and a cam member 32. Flapper valve 30 includes a bracket 34 pivotably mounted to a first side 36 of valve seat 24 and a valve plate 38 mounted to the bracket 34. Bracket 34 includes a base 34a and reinforcing members 34b. Cam member 32 includes first and second lever arms 40, 42 pivotably mounted to a second side 44 of valve seat 24 opposite first side 36. In the embodiment shown, first and second lever arms 40, 42 are equally spaced from a point 46 opposite a center point 48 of the mounting of bracket 34 to valve seat 24. The spacing between the lever arm mount locations is an included angle in the range of about 20 to 90 degrees, preferably about 22 degrees. Seat 24 and valve plate 38 are preferably formed from a suitable plastic, e.g., polyphenolynoxide or polyamide.

Lever arms 40, 42 define cam surfaces 50, 52, respectively, disposed for moving contact with engagement surfaces, e.g., roll pins 54, 56, of bracket 34. Lever arms 40, 42 include biasing means, e.g., double torsion springs 58, 59 (FIGS. 4 and 4A) for biasing cam surfaces 50, 52 toward contact with roll pins 54, 56. The force exerted by springs 58 determines the threshold value biasing the check valve toward its closed position. The greater the spacing between the arm mount locations, the higher the spring force needed to provide an equivalent threshold value.

Referring to FIGS. 3 and 3A, valve plate 38 is mounted to bracket 34 at a central region 70 of the valve plate. A shaft 72, threaded at both ends, extends through a central bore 74 defined by valve plate 38. Valve plate 38 is secured to bracket 34 by a first nut 78 and washer 76 and a second nut 75 and washer 77. Shaft 72 defines a groove 71 in which a shaft seal 73 is placed to create a seal between the shaft and valve plate 38. Nut 75 defines a groove 79 which provides a hand hold to aid in handling during installation and repair of valve 14.

As shown in FIG. 3A, valve plate 38 has a facing surface 39 set at an angle α, e.g., of about 2 degrees, with respect to bracket base 34a with an opposing surface 39a (FIG. 3) positioned horizontally. In closed position, bracket base 34a is also spaced from washer 76 a dimension β of about 0.015". Angle α and spacing p permit the position of valve plate 38 to adjust relative to bracket 34 during closing, allowing valve plate 38 to self-align with seat 24, thereby assuring that the closing force of spring 58, 59, applied at the center region of the valve plate, can be distributed evenly about the entire periphery of the valve plate for sealing against valve seat 24.

Figure 3B:
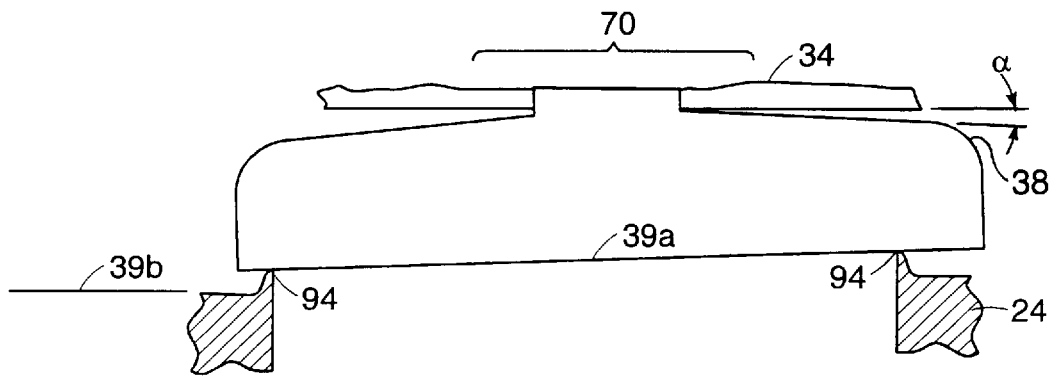
FIG. 3B shows the check valve tilted with respect to a horizontal plane.
Figure 3C:
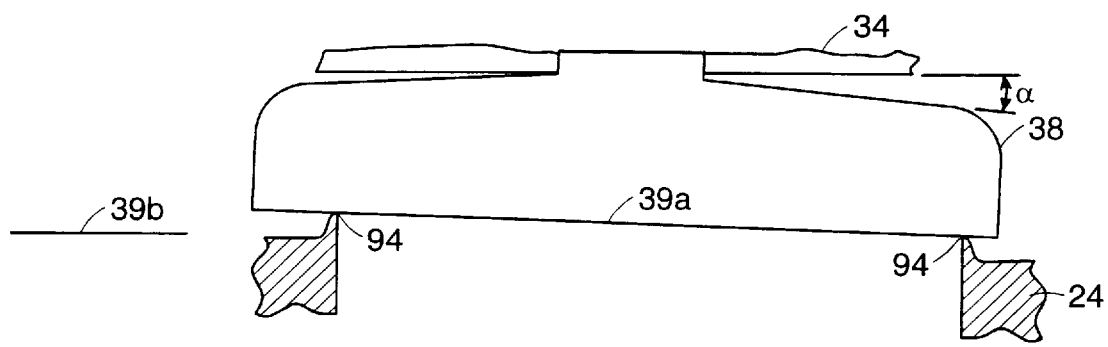
FIG. 3C shows the check valve with an opposite tilt to that of FIG. 3B.

This aspect of the invention is illustrated in FIGS. 3B and 3C. With valve plate opposing surface 39a tilted with respect to a horizontal plane 39b, e.g., due to misalignment of the valve plate or wearing of a plate seal 90 (see FIG. 3), the clearance provided by angle α and dimension β insures contact between bracket 34 and central region 70 of valve plate 38.

Valve plate 38 defines a groove 89 running about its periphery 92 in which is placed elastomeric plate seal 90. With flapper valve 30 in closed position, plate seal 90 is in sealing engagement with a sealing surface 94 of valve seat 24. Two protrusions 101 (only one being shown in the cross-section of FIG. 3) aid in placement of valve 14 into body 12 of the backflow preventer by aligning the valve with corresponding holes in body 12. Valve seat 24 further defines a groove 103 including a seat seal 100 for engagement with inner wall 12a of body 12.

Referring to FIG. 4, valve seat 24 includes a pin 110 to which bracket 34 is pivotably mounted and pins 112, 114 to which arms 40, 42, respectively, of cam member 32 are pivotably mounted. Referring to FIG. 4A, surrounding pin 114 is spring 58 mounted to bias arm 40 toward its closed position (spring 59 is similarly mounted about pin 112 to bias arm 42 toward its closed position).

Figure 5:
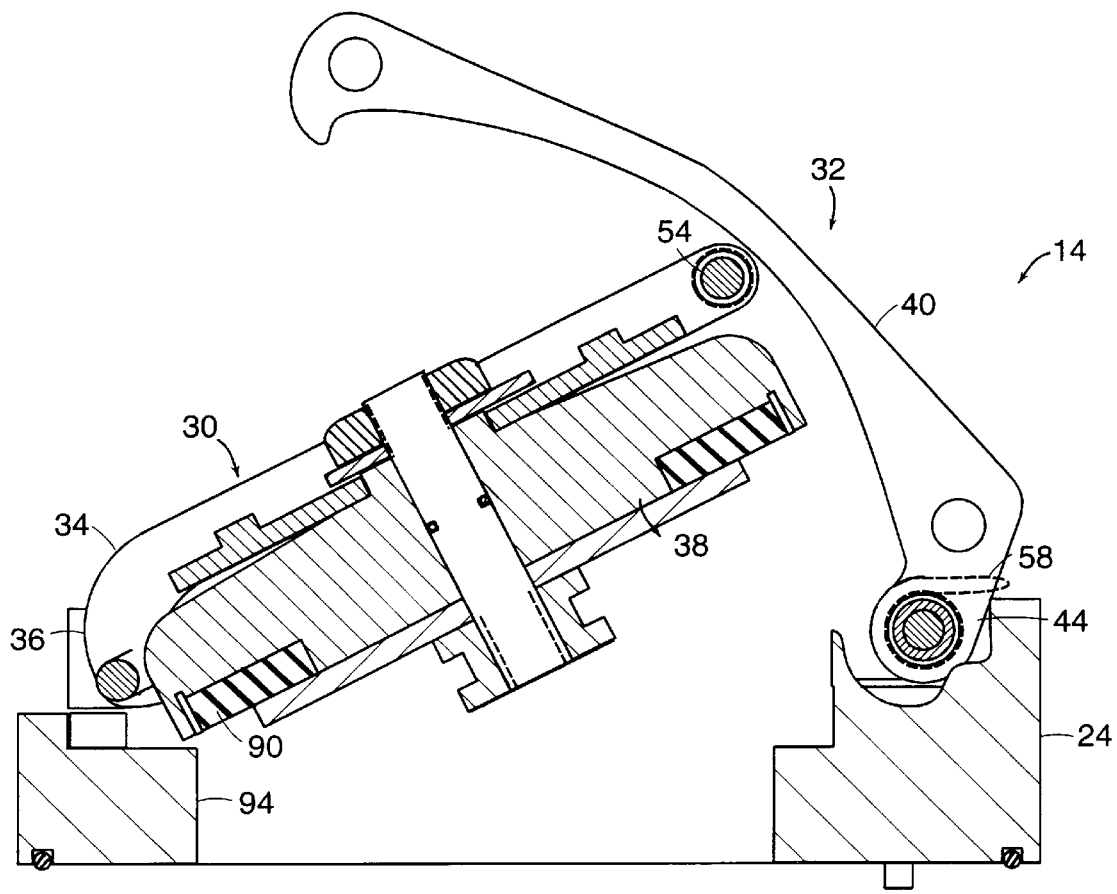
FIG. 5 is a similar view of the check valve of FIG. 3 shown in its open position.

Referring to FIG. 5, when the supply pressure exceeds the predetermined threshold value biasing check valve 14 toward its closed position, flapper valve 30 is lifted off valve seat 24 allowing flow through conduit 13. Roll pins 54, 56 move along cam surfaces 50, 52, respectively, as flapper valve 30 is lifted. Cam surfaces 50, 52, and the corresponding roll pins 54, 56, are relatively placed and contoured such that the load necessary to lift the flapper valve decreases as the flapper valve is lifted.

Other embodiments are within the following claims.

Figure 6:
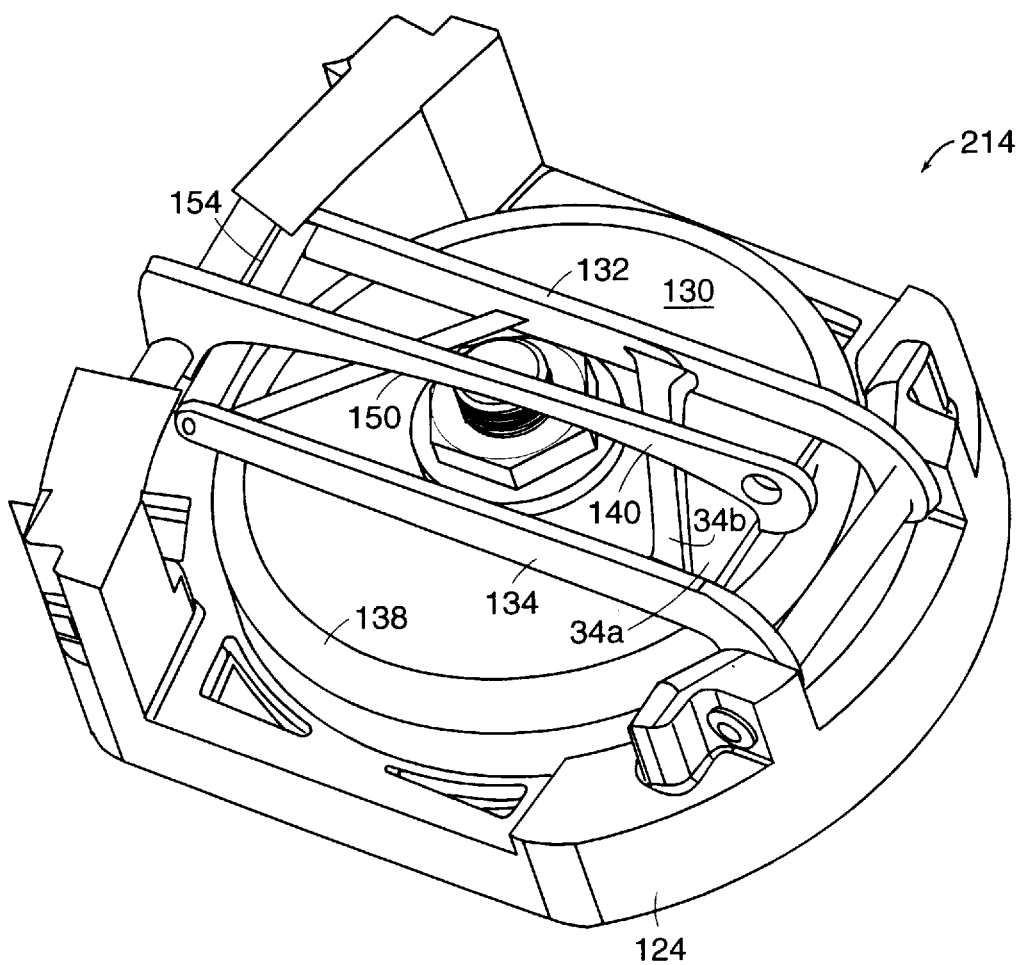
FIG. 6 is a top perspective view of another embodiment of a check valve of the invention.

For example, referring to FIG. 6, check valve 214 includes a flapper valve 130 and a cam member 132. Flapper valve 130 includes a bracket 134 pivotably mounted to a valve seat 124 and a valve plate 138 mounted to bracket 134. Cam member 132 includes a lever arm 140 pivotably mounted to valve seat 124. Lever arm 140 defines a cam surface 150 in moving contact with roll pin 154 of bracket 134. As in the embodiment of FIG. 2, valve plate 138 is mounted to bracket 124 for relative adjustment therebetween.

What is claimed is:

1. A check valve assembly mounted for engagement with a valve seat, said check valve assembly comprising:
   a flapper valve comprising
      a bracket pivotably mounted in a region along a first hemisphere of the value seat,
      a valve plate mounted to said bracket, said valve plate having an upper angled surface accommodating movement relative to said bracket, and
      a mounting assembly joining said valve plate to said bracket,
   said flapper valve having a first, closed position with said valve plate in sealing engagement with the valve seat about said periphery of said valve plate and a second, open position spaced from the valve seat, and
   at least one lever arm pivotably mounted in a region along a second hemisphere of the valve seat opposite said first hemisphere and including a lever surface disposed for moving contact with an engagement surface of said bracket, said lever arm including a biasing means for biasing said lever surface toward contact with said engagement surface.

2. The check valve assembly of claim 1 wherein said valve plate upper angled surface is spaced from said bracket in a region spaced from a central region of said valve plate with said flapper valve in said first closed position, said spacing permitting adjustment of said valve plate relative to said bracket.

3. The check valve assembly of claim 1 wherein said valve plate is mounted to said bracket at a central region of said valve plate.

4. The check valve assembly of claim 1 wherein said lever surface comprises a cam surface.

5. The check valve assembly of claim 1 wherein said bracket comprises a roll pin defining said engagement surface.

6. The check valve assembly of claim 1 wherein said biasing means comprises a spring.

7. The check valve assembly of claim 1 wherein said valve plate further comprises a plate seal for engagement with said valve seat.

8. The check valve assembly of claim 1 further comprising a second lever arm pivotably mounted in said region along said second hemisphere of said valve seat, said bracket defining a second engagement surface and said second lever arm defining a second lever surface disposed for moving contact with said second engagement surface, said second lever arm further comprising a second biasing means for biasing said second lever surface toward contact with said second engagement surface.

9. The check valve assembly of claim 8 wherein said region along said first hemisphere defines a flapper mount location and said region along said second hemisphere defines a first lever arm mount location and a second lever arm mount location, said first lever arm mount location and said second lever arm mount location being equally spaced about a point on said second hemisphere opposite said flapper mount location.

10. The check valve assembly of claim 9 wherein said spacing between said first lever arm mount location and said second lever arm mount location comprising an included angle in the range of about 20 to 90 degrees.

11. The check valve assembly of claim 10 wherein said included angle is 22 degrees.

12. The check valve assembly of claim 1 further comprising a body defining said valve seat, said body adapted for retrofit into an existing valve opening.

13. The check valve assembly of claim 12 wherein said body comprises a seat seal for engagement with the existing valve opening.

14. A check valve assembly mounted for engagement with a valve seat, said check valve assembly comprising:
    flapper valve comprising
        a bracket pivotably mounted to the valve seat at a flapper mount location,
        a valve plate mounted to said bracket, said valve plate having an upper angled surface accommodating movement relative to said bracket, and
        a mounting assembly joining said valve plate to said bracket,
    said flapper valve having a first closed position with said valve plate in sealing engagement with the valve seat about a periphery of said valve plate and a second open position spaced from the valve seat, and
    a cam member comprising
        a first lever arm pivotably mounted to the valve seat at a first lever arm mount location and including a first lever surface disposed for moving contact with a first engagement surface of said bracket, said first lever arm further comprising a first biasing means for biasing said first lever surface toward contact with said first engagement surface, and
        a second lever arm pivotably mounted to the valve seat at a second lever arm mount location and including a second lever surface disposed for moving contact with a second engagement surface of said bracket, said second lever arm further comprising a second biasing means for biasing said second lever surface toward contact with said second engagement surface,
    said first lever arm mount location and said second lever arm mount location being equally spaced about a point opposite said flapper mount location.

15. A backflow preventer comprising:
    a body defining a conduit for flow of fluid between an inlet and an outlet, a first valve and a second valve disposed in sequence in the conduit, the first valve having a first position permitting flow in a first direction and a second position opposing flow in a second direction opposite the first direction, with first means for biasing the first valve toward the second position, and the second valve having a first position permitting flow in the first direction and a second position for opposing flow in the second direction, with second means for biasing the second valve toward the second position,
    said first valve mounted for engagement with a first valve seat, said first valve comprising
    a flapper valve comprising
        a bracket pivotably mounted in a region along a first hemisphere of the valve seat,
        a valve plate mounted to said bracket, said valve plate having an upper angled surface accommodating movement relative to said bracket, and
        a mounting assembly joining said valve plate to said bracket,
    said flapper valve having a first closed position with said valve plate in sealing engagement with the valve seat about said periphery of said valve plate and a second open position spaced from the valve seat, and
    at least one lever arm pivotably mounted in a region along a second hemisphere of the valve seat opposite said first hemisphere and including a lever surface disposed for moving contact with an engagement surface of said bracket, said lever arm including a biasing means for biasing said lever surface toward contact with said engagement surface,
    said second valve mounted for engagement with a second valve seat, said second valve comprising
    a flapper valve comprising
        a bracket pivotably mounted in a region along a first hemisphere of the valve seat,
        a valve plate mounted to said bracket along a region generally spaced from a periphery of said valve plate, and
        a mounting assembly joining said valve plate to said bracket,
    said flapper valve having a first closed position with said valve plate in sealing engagement with the valve seat about said periphery of said valve plate and a second open position spaced from the valve seat, and
    at least one lever arm pivotably mounted in a region along a second hemisphere of the valve seat opposite said first hemisphere and including a lever surface disposed for moving contact with an engagement surface of said bracket, said lever arm including a biasing means for biasing said lever surface toward contact with said engagement surface.

* * * * *